(12) United States Patent
Vermeulen et al.

(10) Patent No.: US 8,839,600 B2
(45) Date of Patent: Sep. 23, 2014

(54) IGNITER FOR A ROCKET ENGINE, METHOD FOR IGNITION OF A ROCKET ENGINE

(75) Inventors: Eduardus Josephus Vermeulen, Etten-Leur (NL); Bernd Mathias Jozef Brauers, Tholen (NL); Wilhelmina Helena Maria Welland-Veltmans, Overijse (BE)

(73) Assignee: Aerospace Propulsion Products, B.V., Klundert (NL)

( * ) Notice: Subject to any disclaimer, the term of this patent is extended or adjusted under 35 U.S.C. 154(b) by 0 days.

(21) Appl. No.: 13/580,315

(22) PCT Filed: Feb. 23, 2011

(86) PCT No.: PCT/NL2011/050127
§ 371 (c)(1),
(2), (4) Date: Sep. 12, 2012

(87) PCT Pub. No.: WO2011/105897
PCT Pub. Date: Sep. 1, 2011

(65) Prior Publication Data
US 2013/0205750 A1 Aug. 15, 2013

(30) Foreign Application Priority Data
Feb. 23, 2010 (NL) ........................ 2004284

(51) Int. Cl.
*F02K 9/28* (2006.01)
*F02C 7/264* (2006.01)
*F02K 9/72* (2006.01)
*F02K 9/94* (2006.01)
*F02K 9/95* (2006.01)

(52) U.S. Cl.
CPC ... *F02K 9/95* (2013.01); *F02K 9/72* (2013.01); *F02K 9/94* (2013.01)
USPC ........................................ 60/39.821; 60/251

(58) Field of Classification Search
USPC ............ 60/251, 253, 219, 220; 102/380, 202, 102/205, 374, 376, 381, 352, 438
See application file for complete search history.

(56) References Cited

U.S. PATENT DOCUMENTS

| | | |
|---|---|---|
| 3,101,589 A | 8/1963 | Hamrick et al. |
| 3,518,828 A | 7/1970 | Bradford et al. |
| 3,906,720 A * | 9/1975 | Boydston ........................ 60/256 |
| 5,765,361 A * | 6/1998 | Jones et al. ..................... 60/204 |
| 6,250,072 B1 | 6/2001 | Jacobson et al. |

OTHER PUBLICATIONS

Klapotke, Chemistry of High-Energy Materials, 2011, Walter de Grutyer GmbH & Co. KG, Berlin/New York, pp. 45-49.*
International Search Report—PCT/NL2011/050127—Mailing Date: Nov. 16, 2011.

* cited by examiner

*Primary Examiner* — Gerald L Sung
(74) *Attorney, Agent, or Firm* — Banner & Witcoff, Ltd.

(57) ABSTRACT

An igniter for a rocket engine or motor comprising a combustion chamber with a solid fuel, an inlet for supplying an oxidizer to the combustion chamber to ignite the solid fuel and an outlet for discharging exhaust gas, wherein the igniter is arranged to discharge exhaust gas to the rocket engine for igniting the rocket engine. The igniter can be used for multiple ignitions and can also be re-used after re-filling.

9 Claims, 3 Drawing Sheets

IGNITER FOR A ROCKET ENGINE, METHOD FOR IGNITION OF A ROCKET ENGINE

Figure 1:
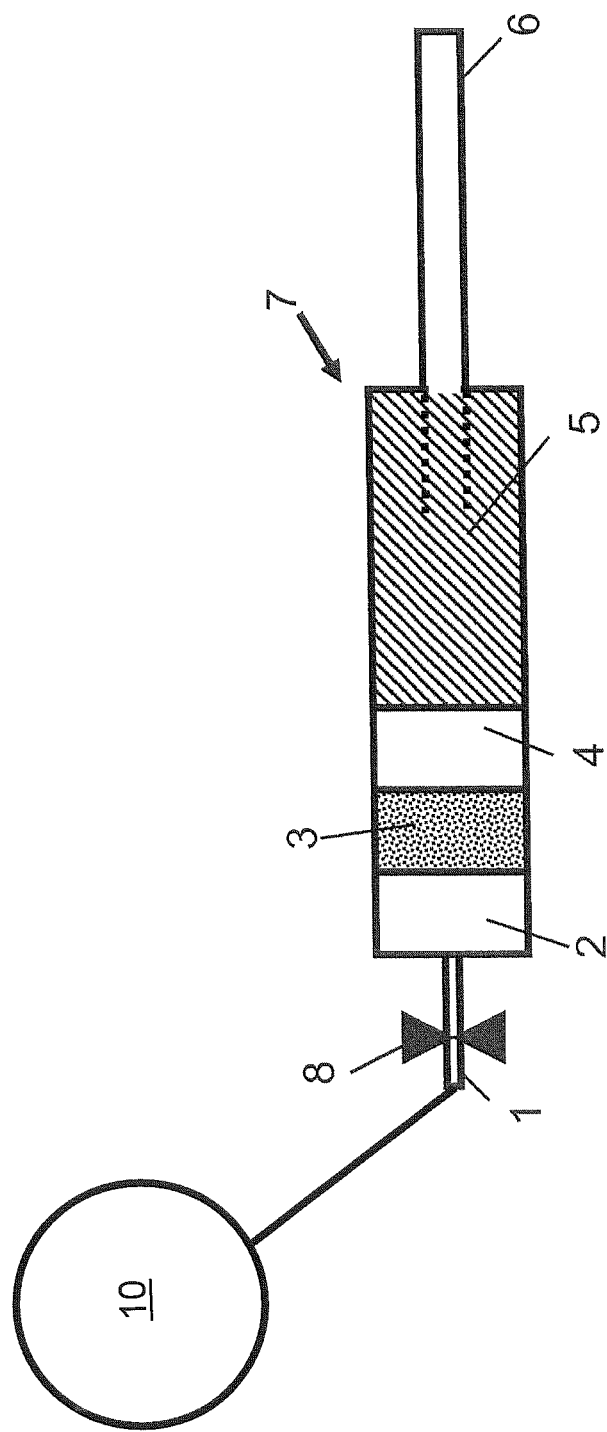

The invention relates to an igniter for a rocket engine.

Igniters for a rocket engine are commonly known and widely used in aerospace applications such as aerospace rockets used for space launcher propulsion. Known igniters may comprise a solid propellant. The solid propellant is usually a mixture of solid fuel with a solid oxidizer. The mixture is prepared in a controlled and/or conditioned environment in a factory. Igniters using solid propellants are relatively simple in design. A drawback of such igniters is that the transport of the premixed propellant, e.g. from the factory location to the use location, and storage of the solid propellant is relatively difficult, dangerous and/or expensive in view of the ignition danger of the premixed propellant. Another drawback of such igniters is that they can only be used once.

Also known are igniters that use spark ignition to ignite liquid and/or gaseous propellants. Igniters using spark ignition may be re-usable. A drawback of using spark ignition is that relatively complex and expensive electronics are required for controlling the sparks. Also, if two gases are used, this may require a relatively complex arrangement for storing them separately.

Publication U.S. Pat. No. 3,518,828 discloses an igniter for a hybrid rocket engine of which the solid propellant is ignited by a conventional electrical squib igniter.

Publication U.S. Pat. No. 6,250,072 discloses reignition of a solid-propellant gas generator using a reactive oxidizer such as hot nitrous oxide to inject into the gas generator chamber.

Publication U.S. Pat. No. 3,101,589 describes a method for igniting rocket engines with hydrazine type fuels using solid oxidizers.

It is an object of the invention to provide an igniter for a rocket engine that obviates at least one of the above mentioned drawbacks while maintaining the advantages.

Thereto, the invention provides for a hybrid igniter for a rocket engine, the hybrid igniter comprising a combustion chamber provided with a solid material, an inlet for supplying a fluid product to the combustion chamber and an outlet for discharging an exhaust gas, such that the exothermic reaction of the fluid product with the solid material in the combustion chamber generates a combustion producing the exhaust gas, wherein the igniter is arranged to discharge the exhaust gas to the rocket engine for igniting the rocket engine.

By providing an igniter with a combustion chamber with a solid material to which a fluid product is supplied, a hybrid igniter is obtained. The hybrid igniter is relatively simple in design and construction contrary to a spark ignition system.

The solid material and the fluid product react with each other in the combustion chamber. Such a reaction is known as an exothermic chemical reaction and may result in an ignition and therefore in a combustion in the combustion chamber. The solid material can be a solid fuel or a solid oxidizer, while the fluid product can be a fluid oxidizer or a fluid fuel respectively. The combination and/or cooperation of the oxidizer with the fuel may result in an ignition and a combustion. The fluid product may be liquid or gaseous. In an embodiment, the combustion chamber may be filled with solid fuel and the fluid oxidizer may be supplied to the combustion chamber via the inlet. In another embodiment, the combustion chamber may be filled with solid oxidizer and the fluid fuel may be supplied to the combustion chamber via the inlet.

Since the fuel is not mixed with the oxidizer in advance, the fuel can be relatively easily and safely stored, transported and handled, separate from the oxidizer. There is no risk of e.g. spontaneous ignition during storage and/or transport of the fuel. Also the oxidizer can be relatively easily and safely stored, transported and handled, separate from the fuel.

The hybrid igniter can be used on different types of rocket engines for space launcher propulsion, for example solid rocket motors, liquid rocket engines. The oxidizer can for example be liquid oxygen or liquid hydrogen peroxide. The fuel can for example be a solid or liquid polymer or hydrocarbon or any other suitable product.

By providing an initiating device the combustion in the combustion chamber may be started. The initiating device can be understood to comprise any means that initiates a combustion process. The initiating device may for example be a catalyst that decomposes the oxidizer. The decomposed oxidizer may facilitate the combustion of the solid fuel in the igniter. The initiating device may also be a heating element that adds heat to e.g. a fluid oxidizer supplied via the inlet to provide ignition of the solid fuel in the combustion chamber. Alternatively, the fluid oxidizer may already be heated and/or catalyzed in advance before being supplied to the igniter. In an embodiment, the initiating device is part of the igniter and is arranged between the inlet and the combustion chamber. The igniter thus can be of relatively compact design while the efficiency of the combustion can be increased. Alternatively, the initiating device may be provided in the combustion chamber itself, e.g. when the combustion chamber is provided with solid oxidizer. The initiating device can then e.g. be a heating element for heating the oxidizer. Also, as an initiating device, the solid material in the combustion chamber may e.g. be provided with a top layer of a reactive product and/or of a specific constitution such that it ignites as soon as the fluid product contacts the top layer. The top layer may e.g. comprise catalyst powder. Also, as an initiating device, in the inlet a few droplets of aggressive fluidum may be sprayed or otherwise provided before the fluid product flows through the inlet. In the combustion chamber the aggressive fluidum provides for an ignition when reacting hypergolically with either the solid material or fluid product.

By providing an injection element, the fluid product can be injected to the combustion chamber, thereby increasing the efficiency of the ignition and/or combustion of the solid material. Preferably, the injection element is arranged at or in the inlet, for example downstream the inlet and upstream the initiating device. In an embodiment, the injection element can also be provided in the inlet or as part of the inlet.

Unlike a solid igniter the hybrid igniter can be re-used, re-ignited and/or throttled. By providing a control element, the igniter can be re-used, re-ignited and/or throttled in a controlled and/or predictable way. The control element is arranged for controlling the supply of the fluid product. The control element can e.g. be a valve that controls the supply of the fluid product. The control element may be installed at or in the inlet or upstream in the supply line of the fluid product. When varying the supply of the fluid product, the combustion can be throttled. For re-use only the solid material needs to be replaced and re-ignition can be achieved by re-supply of the oxidizer. When the solid material needs to be replaced, the valve can be closed, when re-ignition is required, the valve may be opened to supply fluid product to the combustion chamber to induce ignition and combustion. Throttling of the hybrid igniter can be performed by variation of e.g. the oxidizer flow.

The control element may usually be operated remotely, in view of the complex installation of a rocket engine. However, the control element may also be arranged to be operated manually.

After use the solid material is usually approximately completely consumed. The combustion chamber then may be cleaned, e.g. by ultrasonic cleaning, and a new block of solid material may be provided in the combustion chamber. Thereto, the igniter is arranged for refilling the solid material. The igniter may be provided with a part of a housing of the igniter that is removably connected to provide for an opening for refilling the solid material. For example, the bottom or a segment of the walls of the combustion chamber can be removably connected, e.g. via a bolt-nut connection or a screw connection. At the connection heat resistant seals may be used. Alternatively, the inlet and/or the injector can be removably connected to the combustion chamber to provide for an opening for refilling the solid material.

Further advantageous embodiments are represented in the subclaims.

Further, the invention relates to a method for igniting a rocket engine for space launcher propulsion.

The invention will further be elucidated on the basis of an exemplary embodiment which is represented in a drawing. The exemplary embodiment is given by way of non-limitative illustration of the invention.

Figure 2:
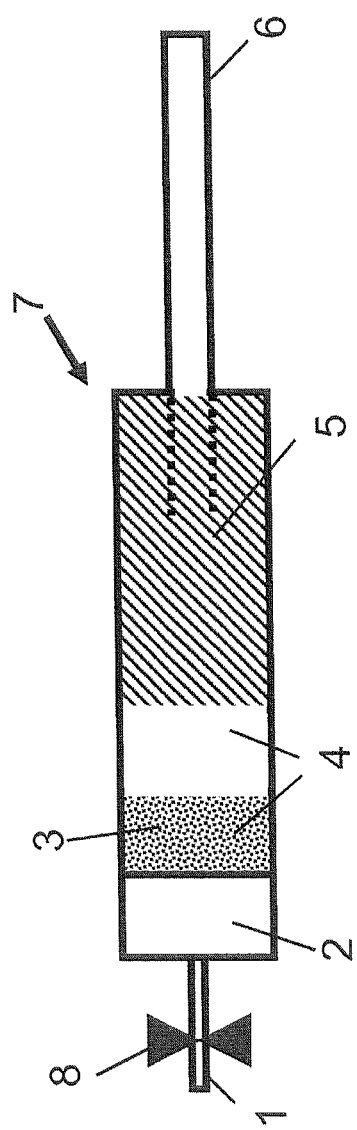
Figure 3:
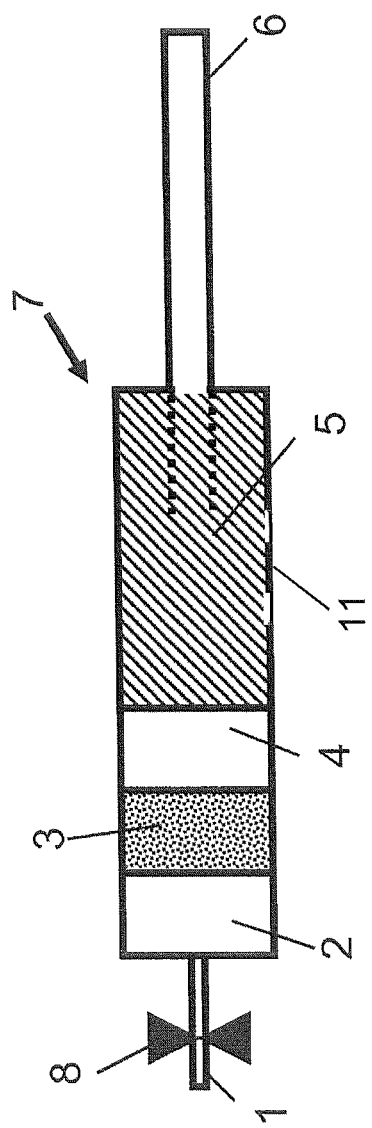

In the drawings:

FIGS. 1-3 show schematic representations of igniters according to various embodiments of the invention.

It is noted that the figure is only a schematic representation of an embodiment of the invention that is given by way of a non-limiting example.

FIG. 1 shows an igniter 7 comprising a combustion chamber 4 which is at least partially filled with a solid material. In this example the solid material is a solid fuel 5. The solid fuel 5 can be based on e.g. HTPB (hydroxy-terminated polybutadiene), PMMA (polymethylmethacrylate), other hydrocarbons or plastics. Fluid fuel may for example comprise hydrocarbons like ethanol, methane. Fluid oxidizer may for example comprise oxygen, hydrogen peroxide, a solid oxidizer may for example comprise ammonium perchlorate, ammonium nitrate. Further, the igniter 7 comprises an inlet 1 for supplying a fluid product 10, in this example liquid or gaseous oxidizer to the combustion chamber 4. The oxidizer ignites the solid fuel 5 which leads to a combustion of the solid fuel 5. The inlet 1 may be coupled to a storage compartment of oxidizer.

The igniter 7 is a hybrid igniter by supplying a fluid product to a solid material. As a fluid product liquid oxidizer may be supplied, however gaseous oxidizer may also be used to ignite the solid fuel in the combustion chamber. Alternatively, liquid or gaseous fuel may be used for combustion with a solid oxidizer in the combustion chamber. The igniter 7 is applied in rocket engines for space launcher propulsion. Combustion of the solid fuel 5 produces hot exhaust gas that is discharged from the igniter 7 via an outlet 6. The hot exhaust gas is discharged to a rocket engine to ignite the rocket engine and to induce combustion of the rocket engine. The outlet 6 of the igniter 7 usually, when installed, discharges the hot exhaust gas of the igniter 7 directly into an ignition chamber and/or combustion chamber of the rocket engine for space launcher propulsion.

The solid fuel 5 in the combustion chamber 4 is used during combustion, so the volume of the solid fuel 5 becomes less during the combustion of the solid fuel 5. The free volume of the combustion chamber 4 therefore increases during combustion of the solid fuel 5. The combustion time of the igniter 7 is usually approximately 0.2-2.0 s, the rocket engine will be ignited and combustion in the rocket engine may have been started. Further, the igniter 7 typically is relatively small in comparison with a rocket engine for space launcher propulsion, typically approximately 100 to approximately 500 mm, more typically approximately 200 to approximately 400 mm.

The combustion can be stopped or re-started at any time by providing a control element 8. In this example, the control element 8 is provided as a valve 8. The valve 8 is here connected to the inlet 1 and is arranged for starting, stopping and/or dosing the flow of the oxidizer. By switching off or on the flow of oxidizer, the combustion can be stopped or started. By varying the flow of the oxidizer, the combustion can be throttled. Of course, the control element also can be provided at a different position, e.g. upstream of the inlet in or at the supply line for the fluid product, which may be oxidizer or fuel.

Further, the igniter 7 comprises here an initiating device 3 which can be for example a catalyst or a heater. A catalyst may decompose the oxidizer, which is for example hydrogen peroxide, to induce ignition of the solid fuel 5 in the igniter 7. A heater can heat the oxidizer, for example oxygen, until the ignition temperature of the solid fuel is reached. Alternatively, the oxidizer can be heated before being supplied to the combustion chamber, e.g. in the inlet or between the inlet and the storage compartment of oxidizer.

Further, the igniter 7 comprises in this embodiment an injection element 2 to inject the oxidizer with relatively high pressure into the combustion chamber 4. Injecting the oxidizer under high pressure into the combustion chamber 4 may be advantageous for the ignition of the solid fuel 5.

The injection element 2 is preferably positioned at or in the inlet 1. In this embodiment, the injection element 2 is placed immediately downstream the inlet 1, but upstream the initiating device 3. The initiating device 3 is placed upstream of the combustion chamber 4. Alternatively, according to the embodiment of FIG. 2, the initiating device 3 may be arranged in the combustion chamber 4.

The hybrid igniter 7 as shown in FIG. 1 has a relatively simple design and can be re-used. For example, after use the solid fuel 5 is used during combustion and only a solid fuel element has to be placed in the combustion chamber. A part of the housing of the combustion chamber may thereto be removably arranged, e.g. via a screw or bolt and nut or a clamp connection. For example a bottom part or an inlet part or a wall part of the combustion chamber may be removable. Or the combustion chamber itself may be a compartment of the igniter which can be easily replaced after use of the igniter for re-use. Or the solid fuel may be provided as a block or a cartridge that can easily be taken out of the igniter after use and a new block or a new cartridge can easily be placed in the igniter for a re-use of the igniter. According to the embodiment of FIG. 3, a part 11 of the housing of the igniter 7 is removably connected to provide for an opening for refilling the solid material. The igniter 7 may be arranged, in this manner, for refilling the combustion chamber 4 with solid fuel 5.

Many variants will be apparent to the person skilled in the art. All variants are understood to be comprised within the scope of the invention as defined in the following claims.

The invention claimed is:

1. A hybrid igniter for a rocket engine, the hybrid igniter comprising a combustion chamber configured to provide a solid material, an inlet for supplying a fluid product to the combustion chamber, an initiating device for inducing ignition of the solid material, and an outlet for discharging an exhaust gas, such that an exothermic reaction of the fluid product with the solid material in the combustion chamber generates a combustion producing the exhaust gas, wherein the igniter is arranged to discharge the exhaust gas to the rocket engine for igniting the rocket engine, and wherein the igniter has a housing with a connection that may be opened for refilling the solid material.

2. An igniter according to claim 1, wherein the solid material is a solid fuel or a solid oxidizer, and the fluid product is a fluid oxidizer or a fluid fuel respectively.

3. The igniter according to claim 1, wherein the initiating device is arranged between the inlet and the combustion chamber.

4. The igniter according to claim 1, wherein the initiating device is arranged in the combustion chamber.

5. The igniter according to claim 1, further comprising an injection element for injecting the fluid product.

6. The igniter according to claim 5, wherein the injection element is arranged at or in the inlet.

7. The igniter according to claim 1, wherein a control element is arranged for controlling the supply of the fluid product.

8. The igniter according to claim 7, wherein the control element is arranged for restarting the igniter.

9. A method for igniting a rocket engine, comprising providing an igniter according to claim 1, supplying a fluid product to the igniter such that combustion of the solid material is provided, supplying the exhaust gas to the rocket engine.

* * * * *